United States Patent
Shima (10) Patent No.: US 12,123,942 B2
(45) Date of Patent: Oct. 22, 2024

(54) TARGET DETECTION APPARATUS

(71) Applicant: DENSO CORPORATION, Kariya (JP)

(72) Inventor: Tatsuya Shima, Kariya (JP)

(73) Assignee: DENSO CORPORATION, Kariya (JP)

( * ) Notice: Subject to any disclaimer, the term of this patent is extended or adjusted under 35 U.S.C. 154(b) by 354 days.

(21) Appl. No.: 17/646,790

(22) Filed: Jan. 3, 2022

(65) Prior Publication Data

US 2022/0128682 A1 Apr. 28, 2022

Related U.S. Application Data (63) Continuation of application No. PCT/JP2020/025526, filed on Jun. 29, 2020.

(30) Foreign Application Priority Data

Jul. 5, 2019 (JP) .................................. 2019-125983

(51) Int. Cl.
*G01S 13/86* (2006.01)
*G01S 13/931* (2020.01)
*G06V 20/58* (2022.01)

(52) U.S. Cl.
CPC ............ *G01S 13/867* (2013.01); *G06V 20/58* (2022.01); *G01S 13/931* (2013.01)

(58) Field of Classification Search
CPC ...... G01S 13/867; G01S 13/931; G01S 13/42; G01S 13/723; G01S 13/52; G01S 13/66; G06V 20/58
See application file for complete search history.

(56) References Cited

U.S. PATENT DOCUMENTS

2017/0045610 A1 2/2017 Mizutani

FOREIGN PATENT DOCUMENTS

| CN | 101950018 A | * | 1/2011 | ........... G01S 13/931 |
| GB | 2576206 A | * | 2/2020 | ........... G01S 13/931 |
| WO | WO2014123112 A1 | * | 8/2014 | ........... G01S 13/931 |
| WO | WO2015159924 A1 | * | 10/2015 | ........... G01S 13/931 |
| WO | WO2017209292 A1 | * | 12/2017 | ........... G01S 13/931 |

* cited by examiner

*Primary Examiner* — Bernarr E Gregory
(74) *Attorney, Agent, or Firm* — MASCHOFF BRENNAN (57) ABSTRACT

In a target detection apparatus, an extraction unit extracts reflection points that are located within a subjected-to-determination region and stationary as subjected-to-determination points. A connection-sequence generation unit generates a connection sequence by extracting the subjected-to-determination points that are sequentially connected to each other at intervals of less than or equal to an allowable connection distance from one of the subjected-to-determination points as a starting point. In response to a determination condition being met, a determination unit determines that the vehicle is traveling in a specific environment where accuracy of the target information is decreased. The determination condition includes a condition that a determination score set according to a number of the subjected-to-determination points belonging to the connection sequence generated by the connection-sequence generation unit exceeds a score threshold.

6 Claims, 11 Drawing Sheets

TARGET DETECTION APPARATUS

CROSS-REFERENCE TO RELATED APPLICATION

This application is a continuation application of International Application No. PCT/JP2020/025526 filed Jun. 29, 2020 which designated the U.S. and claims priority to Japanese Patent Application No. 2019-125983 filed with the Japan Patent Office on Jul. 5, 2019, the contents of each of which are incorporated herein by reference.

BACKGROUND

Technical Field

The present disclosure relates to a technique for detecting a target located in surroundings of a vehicle.

Related Art

A technique is known for determining whether a target is a low-level target (hereinafter referred to as a "low-level target") that is overdrivable by vehicles based on depth information acquired from a distribution of reflection points reflecting radar waves in a vehicle-mounted radar device. That is, a road-surface reflector, such as a manhole which is a low-level target, is detected as an object with almost no depth because its size in the depth direction seen from a vehicle is not more than one meter. Other obstacles detected on the road, specifically vehicles, are detected as objects with depth because radar waves are reflected not only by the rear surface of the vehicle, but also by objects inside the cabin through the glass, and by the underside of the vehicle body.

DESCRIPTION OF SPECIFIC EMBODIMENTS

As a result of detailed research that was performed by the present inventors, the following issue was found with the above known technique, as disclosed in Japanese Laid-Open Patent Publication No. 2015-206646.

In a specific environment, such as a tunnel or a multistory parking lot surrounded by structures, the vehicle-mounted radar device detects a large number of stationary reflection points based on reflected waves from ceilings and the like. Since such reflection points are recognized as representing a target with depth, they are indistinguishable from reflection points detected in the presence of a target that is not overdrivable by vehicles. Thus, the accuracy of detecting information about the target (e.g., the height of the target) is reduced, which in turn reduces the reliability of control using the information.

In view of the foregoing, it is desired to have a technique for determining whether a vehicle is traveling in a specific environment that can reduce the detection accuracy of target information.

One aspect of the present disclosure provides a target detection apparatus including a detection unit, an information generation unit, an extraction unit, a connection-sequence generation unit, and a determination unit. The detection unit is configured to emit radar waves every preset measurement cycle to a detection region set to include a subjected-to-determination region defined by a horizontal angular range around a direction of travel of a vehicle, and based on received signals of reflected waves from reflection points that reflected the radar waves, detect positions and relative velocities of the reflection points. The information generation unit is configured to generate target information that is information about a target located within the detection region, based on results of detection by the detection unit. The extraction unit is configured to extract the reflection points detected by the detection unit, that are located within the subjected-to-determination region and stationary as subjected-to-determination points. The connection-sequence generation unit is configured to generate a connection sequence by extracting the subjected-to-determination points that are sequentially connected to each other at intervals of less than or equal to an allowable connection distance from one of the subjected-to-determination points as a starting point. The determination unit is configured to, in response to at least one predefined determination condition being met, determine that the vehicle is traveling in a specific environment where accuracy of the target information generated by the information generation unit is decreased, where the at least one predefined determination condition includes a condition that a determination score set according to a number of the subjected-to-determination points belonging to the connection sequence generated by the connection-sequence generation unit exceeds a score threshold.

With this configuration, it is possible to determine whether the vehicle is traveling in a specific environment that can reduce the detection accuracy of the target information. Therefore, for example, results of this determination can be used to inhibit execution of control based on unreliable target information.

Embodiments of the present disclosure will now be described with reference to the accompanying drawings.

1. Configuration

Figure 1A:
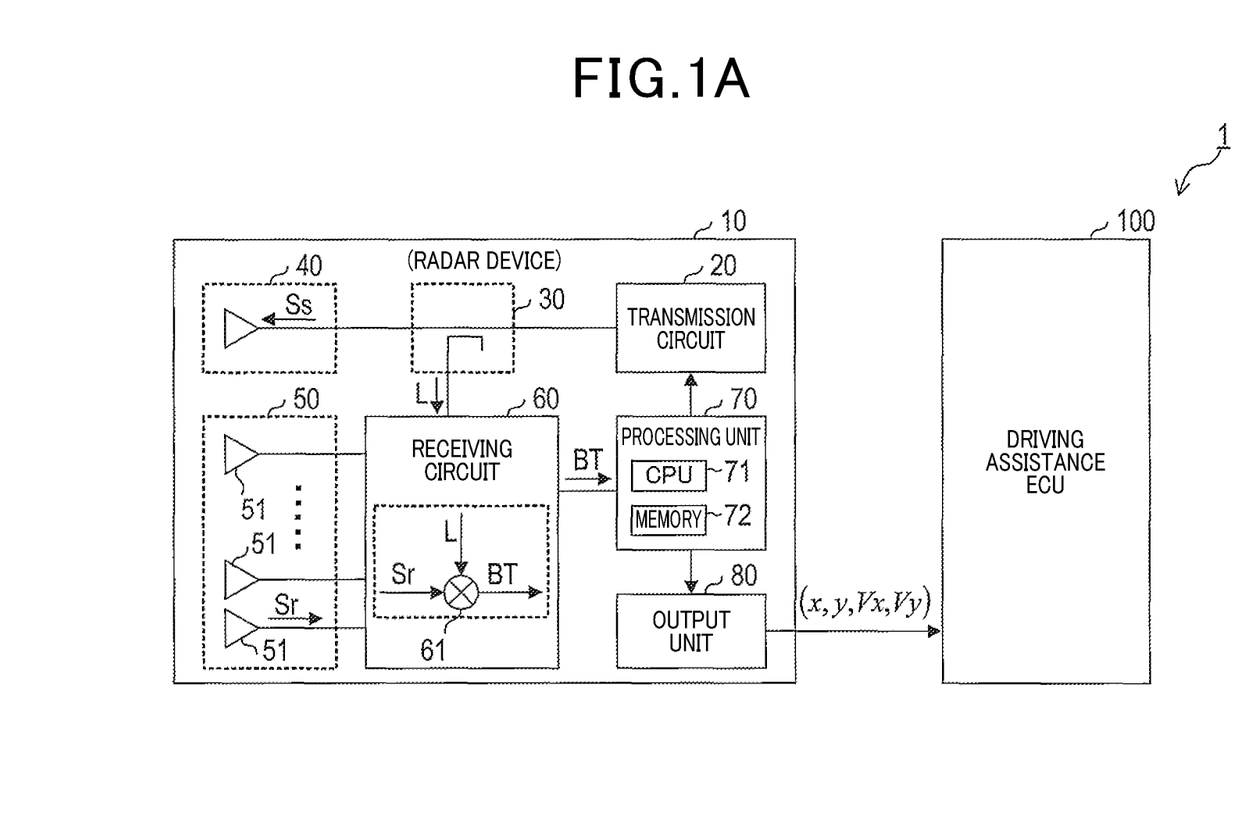
FIG. 1A is a block diagram of a vehicle-mounted system.

A vehicle-mounted system 1, as illustrated in FIG. 1A, includes a radar device 10 and a driving assistance ECU 100, where ECU is an abbreviation for Electronic Control Unit. The vehicle-mounted system 1 is mounted to a vehicle, such as a four-wheeled vehicle which is a moving object. The radar device 10 is installed, for example, at the front end of the vehicle or in proximity to a rearview room, such that a detection region is specified by a predefined angular range centered at 0° (e.g., from −180° to +180°) in the horizontal plane with 0° corresponding to a straight travel direction of the vehicle. In the following, the vehicle carrying the radar device 10 is referred to as an own vehicle. A portion of the detection region (corresponding to, e. g., an angular range of −45° to +45°) is defined as a subjected-to-determination region. The detection region and the subjected-to-determination region are not limited to the above regions, and may be set to be narrower.

The radar device 10 emits radar waves and receives reflected waves, and based on received signals Sr, the radar device 10 observes a distance R to a target that reflected the radar waves, a relative velocity V of the target, and an azimuth θ of the target. The radar device 10 estimates a lateral position x, a longitudinal position y, a lateral velocity Vx, and a longitudinal velocity Vy from the observed values (R, V, θ) acquired from observation, and input the estimated values (x, y, Vx, Vy) to the driving assistance ECU 100. The lateral position x is a position along the widthwise direction of the vehicle carrying the vehicle-mounted system 1, and the longitudinal position y is a position along the direction of travel of the vehicle. The relative velocity V is positive when the target ahead of the vehicle is moving away from the vehicle (i.e., the target is faster than the vehicle) and negative when the target is approaching the vehicle (i.e., the target is slower than the vehicle).

The driving assistance ECU 100 performs various processes to assist the driver in driving the vehicle based on the estimated values (x, y, Vx, Vy) of each target received from the radar device 10. The processes for driving assistance may include, for example, a process of providing an alert to the driver that there is an approaching object, and a process of performing vehicle control to avoid a collision with the approaching object or automatically make a lane change by controlling a brake system, a steering system, or the like.

The radar device 10 includes a transmission circuit 20, a distributor 30, a transmitting antenna 40, a receiving antenna 50, a receiving circuit 60, a processing unit 70, and an output unit 80.

The transmission circuit 20 is a circuit for supplying a transmission signal Ss to the transmitting antenna 40. Specifically, the transmission circuit 20 inputs a radio-frequency signal to the distributor 30 every preset measurement cycle. The radio-frequency signal is frequency modulated in the FMCW method in which the frequency increases and decreases in a triangular wave-like manner. That is, the radar device 10 transmits and receives Frequency Modulated Continuous Waves (FMCW) to operate as an FMCW radar.

The distributor 30 distributes the radio-frequency signal received from the transmission circuit 20 to a transmission signal Ss and a local signal L.

The transmitting antenna 40 emits a radar wave of a frequency corresponding to the transmission signal Ss supplied from the distributor 30.

The receiving antenna 50 is an antenna for receiving reflected waves that are radar waves reflected by targets. The receiving antenna 50 is configured as a linear array antenna having a plurality of antenna elements 51 arranged in a row. A received signal Sr of the reflected wave received by each antenna element 51 is input to the reception circuit 60.

The receiving circuit 60 processes the received signal Sr received from each antenna element 51 of the receiving antenna 50, and generates and outputs a beat signal BT for each antenna element 51. Specifically, the reception circuit 60 generates and outputs the beat signal BT for each antenna element 51 by mixing the received signal Sr received from the antenna element 51 and the local signal L received from the distributor 30 using the mixer 61.

A process of amplifying the received signal Sr, a process of removing unnecessary signal components from the beat signal BT, and a process of converting the beat signal BT into digital data may be performed prior to outputting the beat signal BT. Thus, the reception circuit 60 converts the generated beat signal BT for each antenna element 51 into digital data and outputs the digital data. The output beat signal BT for each antenna element 51 is input to the processing unit 70. In the following, the processing chain distinguished for each antenna element 51 is referred to as a reception channel.

The processing unit 70 includes a microcomputer formed of a CPU 71 and a semiconductor memory, such as a RAM or a ROM, (hereinafter referred to as memory 72). The processing unit 70 may include a coprocessor adapted to perform a fast Fourier transform (hereinafter referred to as FFT) or the like. The processing unit 70 corresponds to a target detection apparatus.

The processing unit 70 performs at least a target detection process. In the target detection process, the processing unit 70 analyzes the beat signal BT for each reception channel and thereby detects targets located within the detection region based on information about reflection points that reflected the radar wave and calculates the estimated values (x, y, Vx, Vy) for each detected target. In the target detection process, the processing unit 70 also determines, based on the information about the reflection points that reflected the radar wave, whether the vehicle is traveling in a specific environment. The specific environment refers to an environment enclosed by side walls and ceilings along a passage, such as a tunnel or a closed-in parking lot.

The processing unit 70 corresponds to a target detection apparatus, and the driving assistance ECU 100 corresponds to a downstream processing unit.

2. Processes

2-1. Target Detection Process

Figure 2:
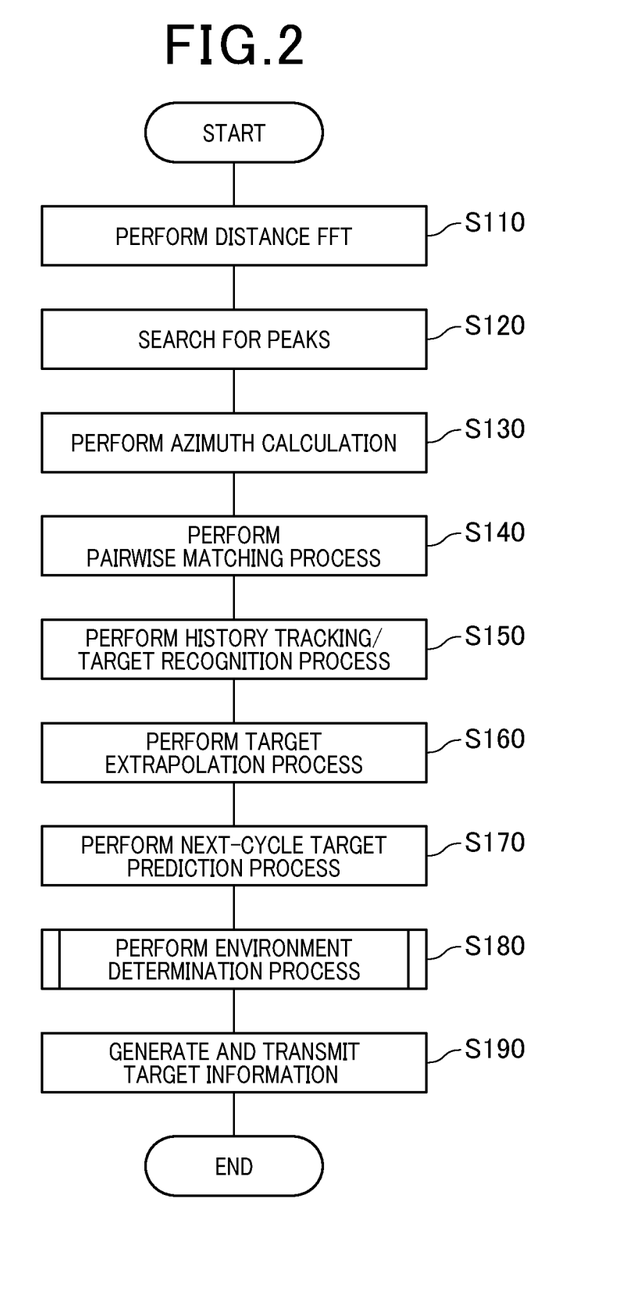
FIG. 2 is a flowchart of a target detection process.

The target detection process performed by the processing unit 70 will now be described using the flowchart illustrated in FIG. 2. This process is repeatedly performed every measurement cycle.

At S110, the processing unit 70 performs, for each reception channel, a frequency analysis process on sampled data accumulated during the previous measurement cycle for each of up and down chirps, thereby calculating a power spectrum.

An FFT process is performed as the frequency analysis process, where FFT is an abbreviation for Fast Fourier Transform. The power spectrum acquired by the FFT is referred to as an FFT spectrum. In the FFT spectrum, the power of the reflected wave is expressed for each frequency bin. The frequency bin is a frequency range as a unit scale of the FFT spectrum, and is determined by the number of samples of data subjected to the FFT and the sampling frequency.

The up chirp is a signal whose frequency increases with time in the FMCW, and the down chirp is a signal whose frequency decreases with time in the FMCW. In the following, the FFT spectrum for the up chirp is referred to as an UP-FFT spectrum, and the FFT spectrum for the down chirp is referred to as a DN-FFT spectrum.

Subsequently, at S120, the processing unit 70 extracts, from the UP-FFT spectrum and the DN-FFT spectrum generated at S110, all of peaks with the power equal to or greater than a power threshold as subject peaks. The power threshold is set to a value higher than the noise floor of the FFT spectrum.

Subsequently, at S130, the processing unit 70 performs azimuth calculation for each of the UP-FFT spectrum and the DN-FFT spectrum calculated at S120.

In the azimuth calculation, an azimuth is calculated based on the fact that the peaks detected in the same frequency bin for the respective channels are different in phase. The azimuth calculation leads to generation of a two-dimensional spectrum with the frequency bin and the azimuth as coordinate axes. A high-resolution algorithm, such as MUSIC, may be used for the azimuth calculation. MUSIC is an abbreviation for Multiple Signal Classification. Beamforming or the like may be used for the azimuth calculation. The azimuth calculation is performed at least for all of the frequency bins having a peak detected on the FFT spectrum at S120. In the following, the two-dimensional spectrum for the up chirp is referred to as an UP spectrum, and the two-dimensional spectrum for the down chirp is referred to as a DN spectrum.

Subsequently, at S140, the processing unit 70 performs a pairwise matching process to pair an up peak frequency component detected in the UP spectrum with a down peak frequency component detected in the DN spectrum generated at S130. Specifically, the processing unit 70 pairs up an up peak frequency component with a down peak frequency component in response to at least either the signal levels of them extracted at S120 or the azimuths of them calculated at S130 approximately corresponding to each other, that is, in response to at least either the signal levels of them extracted at S120 or the azimuths of them calculated at S130 being equal to or less than a preset match determination threshold. Furthermore, for each pair of the up and down peak frequency components, the processing unit 70 calculates, using a known method of the FMCW radar, a distance and a relative velocity between the up and down peak frequency components, and registers, as a proper pair representing a radar wave reflection point, each one of the pairs of the up and down peak frequency components whose calculated distance is less than a preset upper limit distance and whose calculated relative velocity is less than a preset upper limit velocity.

Subsequently, at S150, the processing unit 70 performs a history tracking/target recognition process to recognize targets by tracking. In tracking, each pair registered at S140 in the current measurement cycle is a current pair, and each pair registered at S140 in the previous measurement cycle is a previous pair. For each current pair, it is determined whether the current pair represents the same target as the previous pair.

Specifically, the processing unit 70 calculates a positional difference which is a difference between the predicted position of the current pair based on information about the previous pair and the detected position calculated from the current pair, and a velocity difference which is a difference between the predicted velocity of the current pair based on the information about the previous pair and the detected velocity calculated from the current pair. In response to the positional difference and the velocity difference being within the respective preset allowable ranges, the processing unit 70 considers the previous pair and the current pair to be reflections from the same target, thereby performing history connection.

Then, the current pair that has experienced the history connection for several measurement cycles (e.g., five cycles) is recognized as a target. The current pair sequentially takes over information about the previous pair with history connection to the current pair, such as the number of history connections, an extrapolation counter and an extrapolation flag (to be described later), as well as information about properties of the target represented by the pair. In addition, each pair before being recognized as a target is referred to as a candidate pair.

Subsequently, at S160, the processing unit 70 generates an extrapolated pair based on predicted values for the previous cycle target that has no historical connection to the current cycle target, and performs a target extrapolation process to add the extrapolated pair as a current cycle target. The current cycle target is the target recognized at S150 in the current measurement cycle, and the previous cycle target is the target recognized at S150 in the previous measurement cycle.

For each current cycle target, an extrapolation flag indicating whether extrapolation has been performed and an extrapolation counter indicating the number of times extrapolation has been performed in succession are set. In response to the current cycle target being a real pair, the extrapolation flag and the extrapolation counter are reset to zero. In response to the current cycle target being an extrapolated pair, the extrapolation flag is set and the extrapolation counter is incremented. In response to the count value of the extrapolation counter reaching a predefined discard threshold, the target is discarded as lost.

Subsequently, at S170, for each of the current cycle targets registered at S150 and S160, the processing unit 70 performs a next-cycle target prediction process to acquire a peak frequency and an azimuth angle expected to be detected in the next cycle.

Subsequently, at S180, based on information about the current pair acquired the S110 to S140, the processing unit 70 performs an environment determination process to determine whether the own vehicle is traveling in a specific environment. The environment determination process will be described later in detail.

Subsequently, at S190, the processing unit 70 generates, for each of the current cycle targets registered at S150 and S160, the estimated values (x, y, Vx, Vy) of the position and the velocity. Further, the processing unit 70 transmits these estimated values, together with a specific environment flag representing a result of determination at S180, to the driving assistance ECU 100, and terminates the target detection process. The estimated values may include height information of a stationary target estimated using information representative of a depth of the target.

2-2. Environment Determination Process

Figure 3:
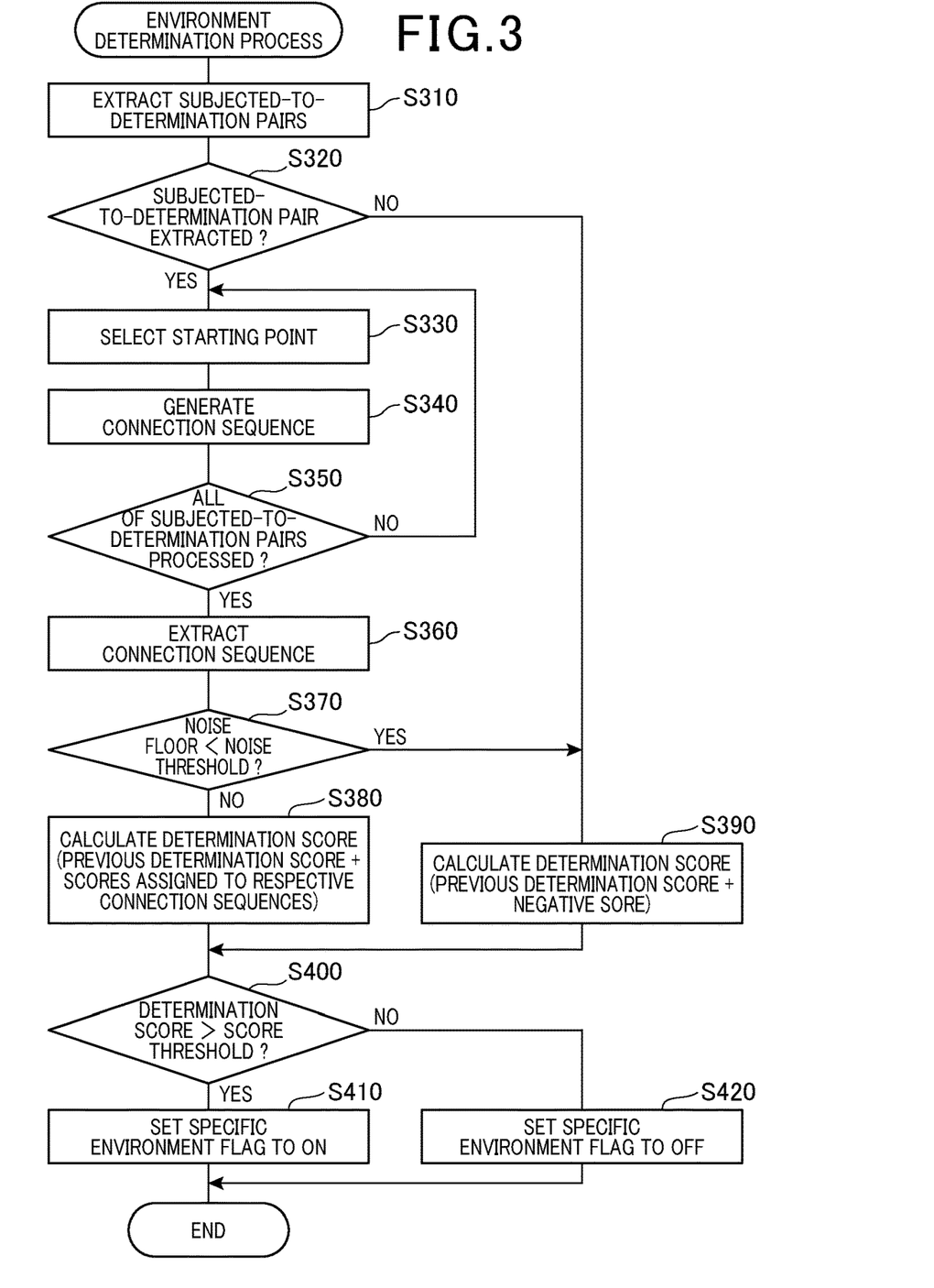
FIG. 3 is a flowchart of an environment determination process.

The environment determination process performed by the processing unit 70 at S180 will now be described with reference to the flowchart in FIG. 3.

At S310, the processing unit 70 extracts, from the current pairs extracted at S140, subjected-to-determination pairs to be used for environment determination. The reflection point identified by each subjected-to-determination pair corresponds to a subjected-to-determination point. Specifically, a current pair that is located within the subjected-to-determination region set ahead of the vehicle, has a power equal to or greater than the power threshold, and meets a stationary condition (i.e., a reflection point that can be regarded as stationary) is extracted as a subjected-to-determination pair. The stationary condition is that the relative velocity calculated from information about the current pair is within a range of the velocity of the own vehicle −5 km/h to the velocity of the own vehicle +5 km/h.

Subsequently, at S320, the processing unit 70 determines whether at least one subjected-to-determination pair has been extracted at S310. If at least one subjected-to-determination pair has been extracted, then the processing unit 70 proceeds to S330. Otherwise, the processing proceeds to S390.

At S330, the processing unit 70 selects a starting point pair for a connection sequence from the subjected-to-determination pairs extracted at S310. Specifically, the subjected-to-determination pair that is closest to the own vehicle is selected as the starting point pair. If this step is performed after the answer is NO at S350 (described later), the subjected-to-determination pair is selected from the subjected-to-determination pairs that do not belong to the connection sequence generated at S340. The starting point pair may be selected from the subjected-to-determination pairs that are located within a predetermined distance from the own vehicle.

Figure 4:
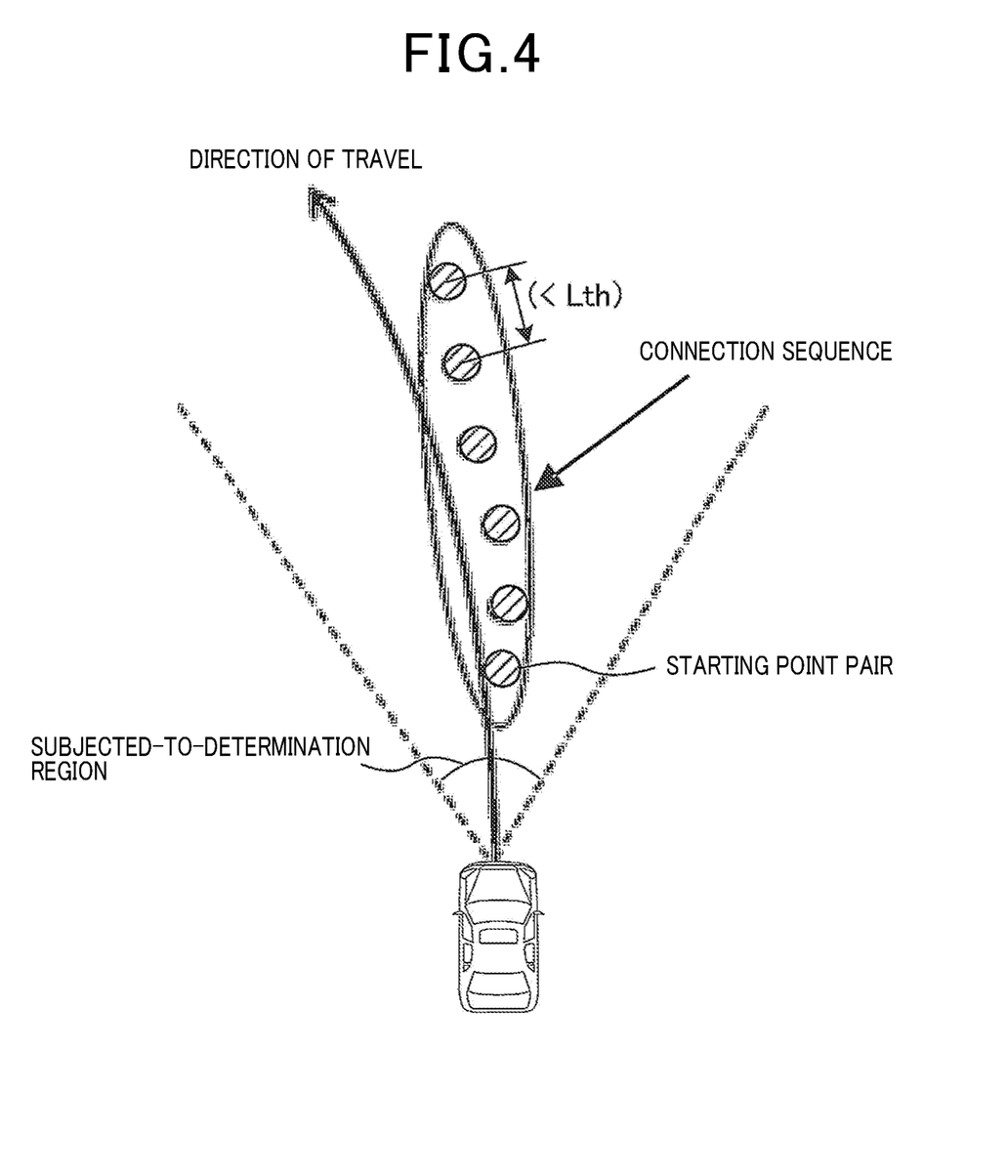
FIG. 4 is an illustration of reflection points based on reflections from a ceiling detected in a specific environment.

Subsequently, at S340, the processing unit 70 extracts a group of subjected-to-determination pairs that include the starting point pair and meet a connection condition. Hereinafter, the extracted group of subjected-to-determination pairs are referred to as a connection sequence. Here, as illustrated in FIG. 4, the connection condition is that there is a pair located within an allowable connection distance Lth from a point of interest and along the direction of travel of the own vehicle. That is, the subjected-to-determination pair that meets the connection condition is first added to the connection sequence using the starting point pair as the point of interest. Using the added subjected-to-determination pair as a new point of interest, another subjected-to-determination pair that meets the connection condition is successively added to the connection sequence. The connection sequences generated in this way may include a connection sequence whose component is a single subjected-to-determination pair that does not meet the connection condition with any subjected-to-determination pair.

Subsequently, at S350, the processing unit 70 determines whether each of all of the subjected-to-determination pairs belongs to any one of the connection sequences. If the answer is YES, then the processing unit 70 proceeds to S360. Otherwise, the processing unit 70 proceeds to S330.

At S360, the processing unit 70 extracts, from the connection sequences generated at S340, a connection sequence subjected to environment determination, using a velocity condition. The velocity condition is that the following inequality (1) is met.

$$|Vc1| \leq |Vi| \leq |Vc|\cos\theta \quad (1)$$

Here, Vc is the velocity of the own vehicle, Vi is the relative velocity of the subjected-to-determination pair representing the connection sequence in the range direction of the radar wave. The illumination coverage of the radar wave in the vertical direction relative to the horizontal direction is a range of +θ to −θ.

The relative velocity of the subjected-to-determination pair representing the connection sequence may be the relative velocity of the starting point pair or the average of relative velocities of the starting point pair and a plurality of subjected-to-determination pairs in proximity to the starting point pair.

Figure 5:
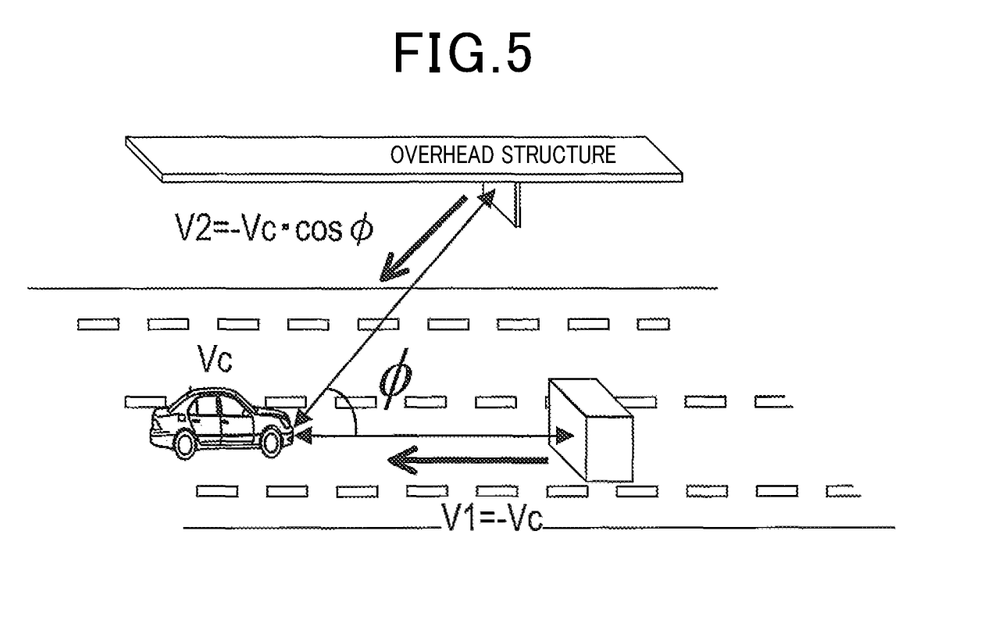
FIG. 5 is an illustration of a velocity condition used to extract a connection sequence subjected to determination.

That is, as illustrated in FIG. 5, the relative velocity of a stationary target located ahead of the own vehicle, V1, is expressed by the equation (2), and the relative velocity of a stationary target ahead of and above the own vehicle, V2, is expressed by the equation (3). The direction of arrival of the reflected wave from the ceiling has an angle (p with respect to the travel direction. The angle φ meets 0<φ≤θ. From the equations (2) and (3), the inequality (4) can be derived. Using this relationship, at S360, the targets located laterally with respect to the own vehicle are removed, and the connection sequence consisting of the subjected-to-determination pairs located above the own vehicle is extracted.

$$V1 = -Vc \quad (2)$$

$$V2 = -Vc \times \cos\varphi \quad (3)$$

$$|V2| < |V1| = |Vc| \quad (4)$$

Subsequently, at S370, the processing unit 70 determines whether the FFT spectrum calculated at S110 meets a noise floor condition, that is, whether the noise floor of the FFT spectrum calculated at S110 exceeds a noise threshold. If the processing unit 70 determines that the noise floor exceeds the noise threshold, the processing unit 70 proceeds to S380. If the noise floor does not exceed the noise threshold, the processing unit 70 proceeds to S390.

Figure 6:
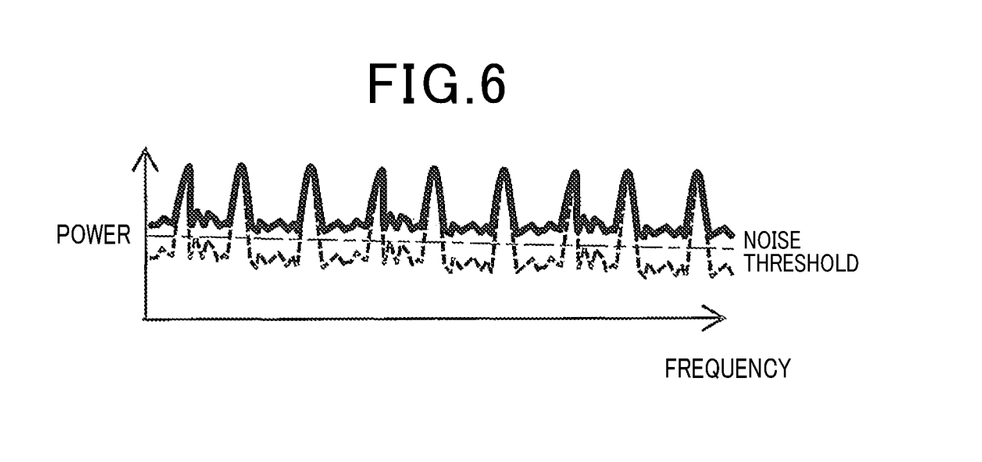
FIG. 6 is an illustration of a noise floor condition used to determine whether a vehicle is traveling in a specific environment.

Since the FFT spectrum calculated in a normal environment has a noise floor lower than the noise threshold as indicated by the dashed line in FIG. 6, the answer is YES at S370. Since the FFT spectrum calculated in a specific environment, as indicated by the solid line in FIG. 6, has a noise floor higher than the noise threshold, the answer is NO at S370. That is, a determination as to whether the environment is a specific environment is made at S370 using the fact that the noise floor rises in a specific environment due to multiple reflected waves arriving from various directions. The noise threshold may be determined by results of experiment such that the above determination can be made with desired accuracy.

At S380, the processing unit 70 calculates a determination score and proceeds to S400. Specifically, a score is assigned to each of the subjected-to determination connection sequences extracted at S360. The determination score in the current measurement cycle is calculated by adding the total of the scores assigned to the connection sequences to the determination score calculated in the previous measurement cycle (hereinafter referred to as the previous score). The determination scores are calculated such that the lower limit is zero. The score to be assigned to each connection sequence is set based on the number of connections which is the number of subjected-to-determination pairs belonging to the connection sequence. Specifically, for example, if the number of connections is 0 (i.e., the number of subjected-to-determination pairs belonging to the connection sequence is 1), a negative score (e.g., −10) is assigned. If the number of connections is equal to or greater than 1, a positive sore is assigned that is the number of connections multiplied by a coefficient (e.g., 10). The coefficient to be multiplied by the number of connections may be changed according to the number of connections such that, for example, the larger the number of connections, the larger the coefficient. In addition, all of the extracted connection sequences may be used to calculate the determination score. Alternatively, only a predetermined number of connections with a larger number of connections may be used to calculate the determination score.

At S390, the processing unit 70 adds a negative score (e.g., −20) to the previous determination score to thereby calculate the current determination score, and then proceeds to S400. That is, if the noise floor is equal to or lower than the noise threshold or if no connection sequence is extracted, the determination score is decreased as it is likely that the environment is not a closed environment such as a specific environment.

At S400, the processing unit 70 compares the determination score calculated at S380 or S390 with a score threshold. If the determination score is greater than the score threshold, then the processing unit 70 proceeds to S410. If the determination score is equal to or less than the score threshold, the processing unit 70 proceeds to S420.

At S410, the processing unit 70 sets the specific environment flag to ON to indicate that the environment in which the vehicle is traveling is a specific environment, and then terminates the environment determination process.

At S420, the processing unit 70 sets the specific environment flag to OFF to indicate that the environment in which the vehicle is traveling is not a specific environment but a normal environment, and then terminates the environment determination process.

That is, the score threshold used at S400 is set based on results of experiment such that whether the environment is a specific environment can be determined with desired accuracy.

The driving assistance ECU 100 receives, from the processing unit 70, the specific environment flag together with the target information, and extracts targets for which the own vehicle is controlled based on the target information, and performs alert generation, brake control, and steering control for avoiding danger. In addition, in response to the specific environment flag being ON, the driving assistance ECU 100 reduces the sensitivity of control to suppresses control for the targets.

Figure 1B:
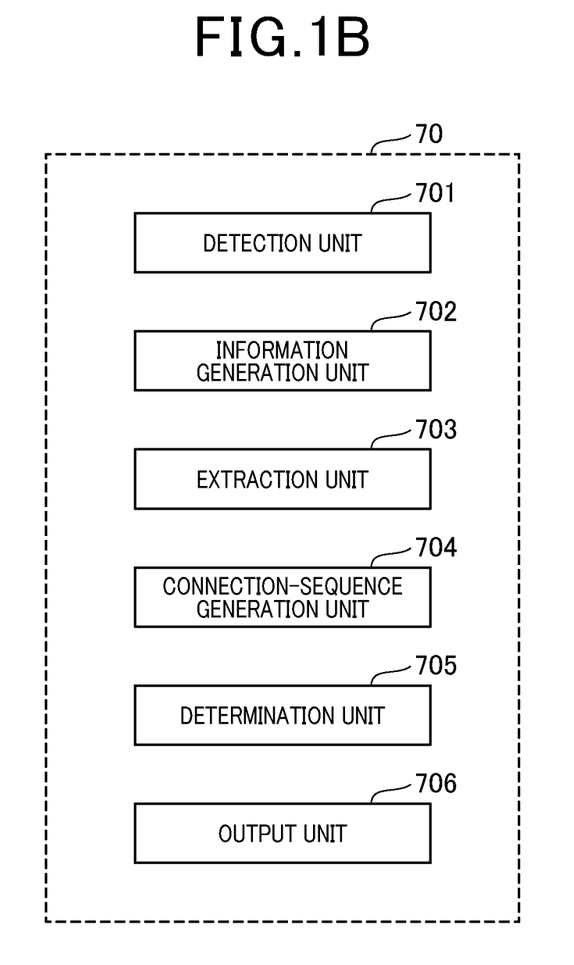
FIG. 1B is a functional block diagram of a processing unit.

FIG. 1B illustrates a functional block diagram of the processing unit 70. The processing unit 70 includes, as functional blocks, a detection unit 701, an information generation unit 702, an extraction unit 703, a connection-sequence generation unit 704, a determination unit 705, and an output unit. Functions of these functional blocks 701-706 are implemented by the CPU 71 executing a program stored in the memory 72 (specifically, in the ROM).

The process steps S110 to S140 correspond to the process steps to be performed by the detection unit 701. The process steps S150 to S170 correspond to the process steps to be performed by the information generation unit 702. The process step S190 corresponds to the process step to be performed by the information generation section 702 and the output unit 706. The process step S310 corresponds to the process step to be performed by the extraction unit 703. The process steps S330 to S350 corresponds to the process steps to be performed by the connection-sequence generation unit 704. The process steps S360 to S420 correspond to the process steps to be performed by the determination unit 705.

3. Measurement

Figure 7:
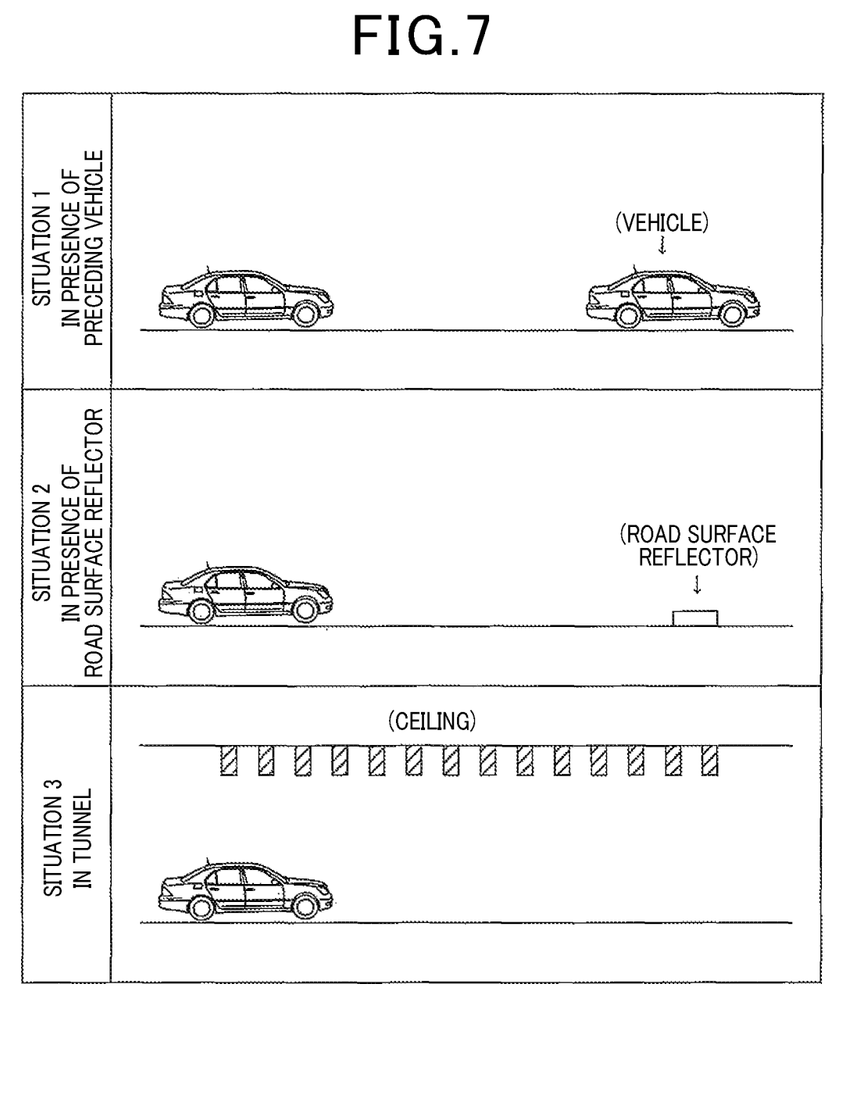
FIG. 7 is an illustration of typical situations involved in an environment determination process.
Figure 8:
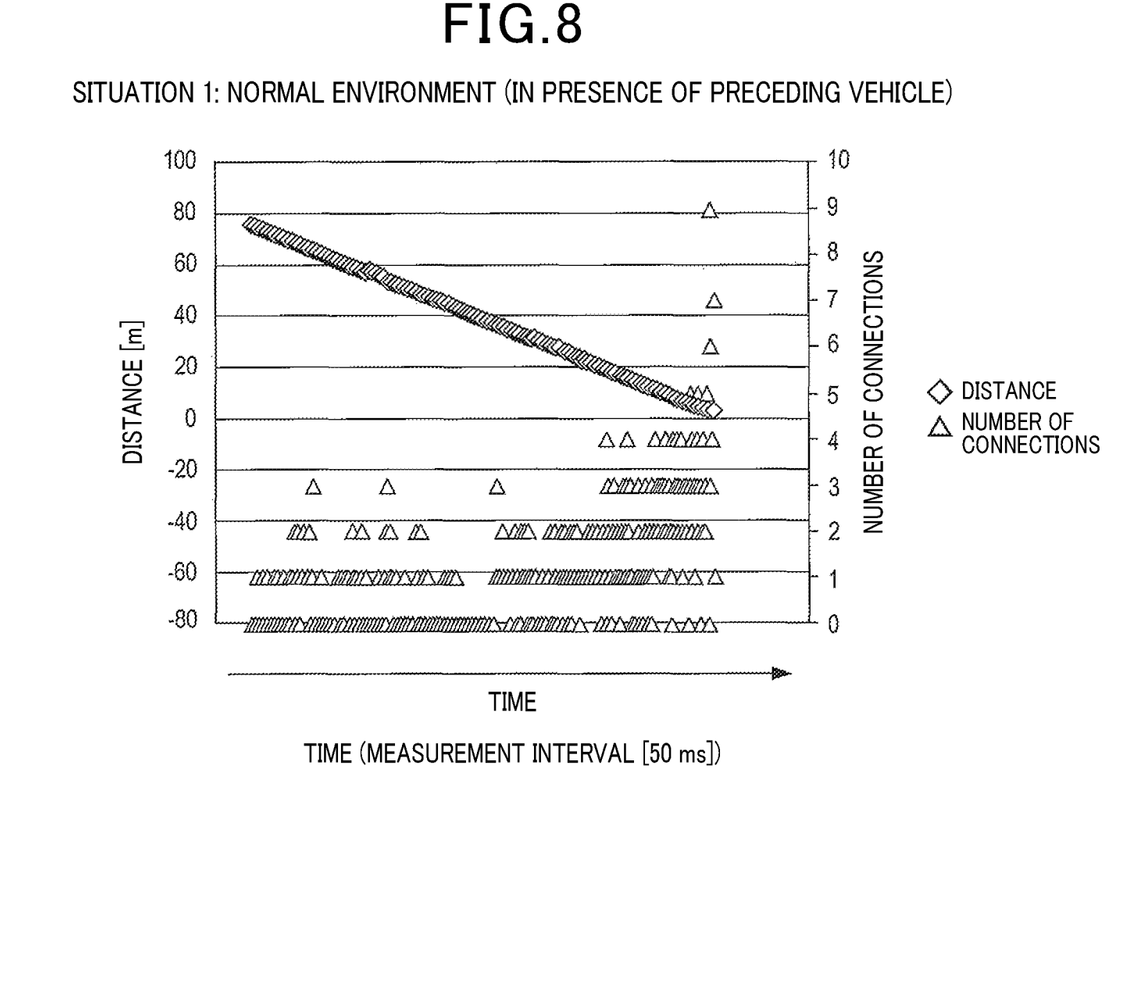
FIG. 8 is a graph illustrating results of measuring, in a normal environment and in the presence of a preceding vehicle, the received power of reflected waves from the preceding vehicle and the number of connected reflection points in association with elapsed time (i.e., changes in distance to the preceding vehicle)
Figure 9:
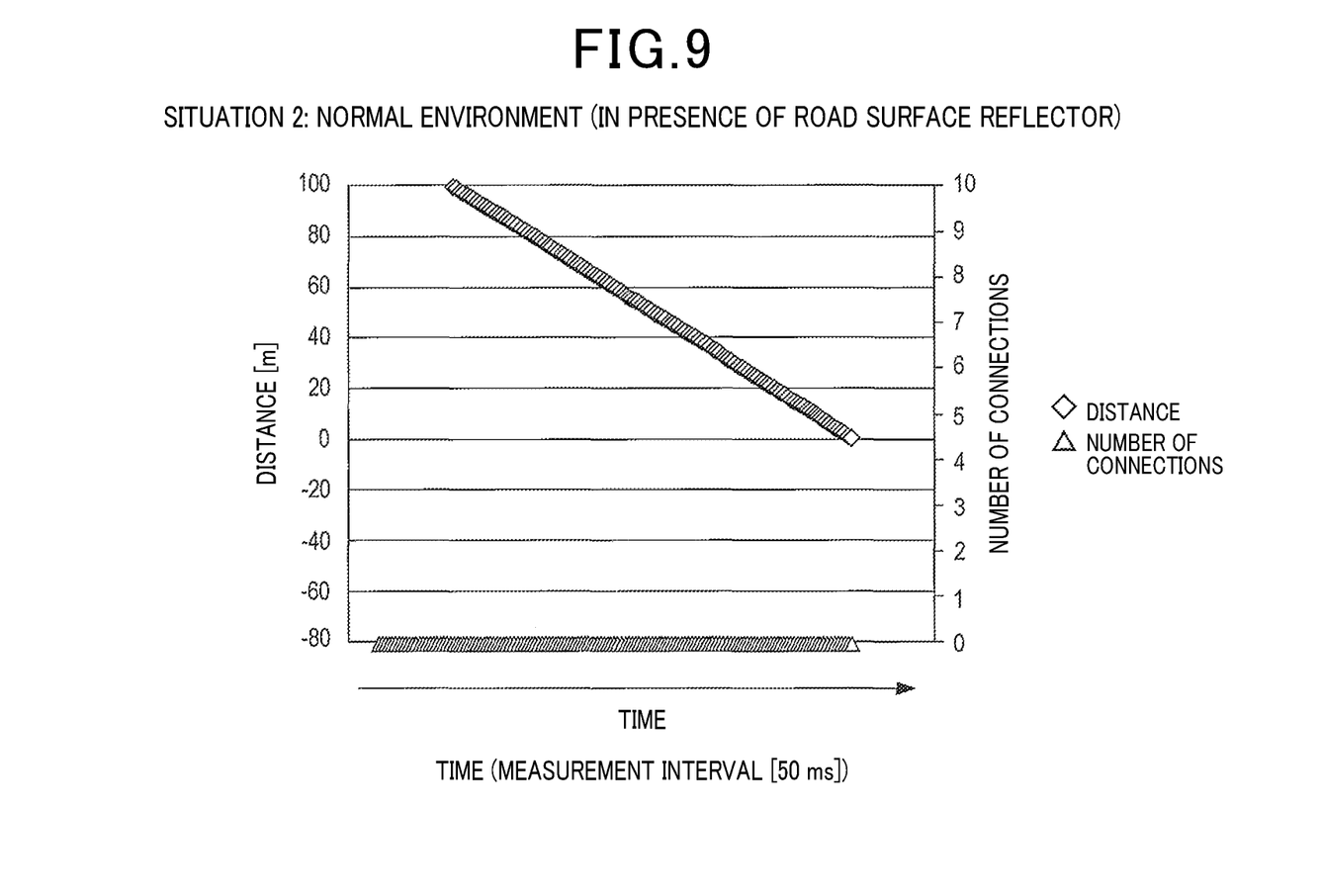
FIG. 9 is a graph illustrating results of measuring, in a normal environment and in the presence of a road surface reflector, the received power of reflected waves from the road surface reflector and the number of connected reflection points in association with elapsed time (i.e., changes in distance to the road surface reflector)
Figure 10:
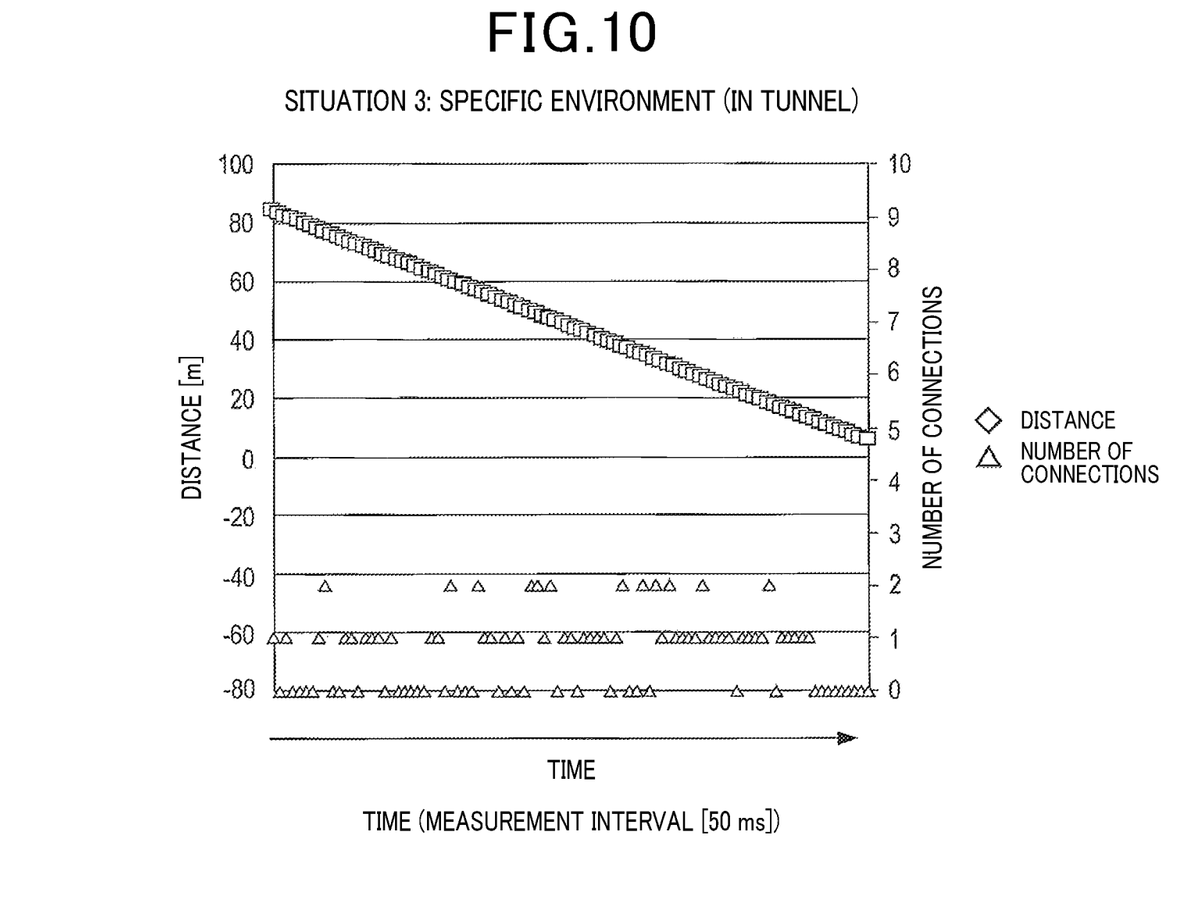
FIG. 10 is a graph illustrating results of measuring, in a situation where a vehicle is traveling in a tunnel as a specific environment, the received power of reflected waves from a ceiling and the number of connected reflection points in association with elapsed time (i.e., changes in distance to a target point)

FIGS. 8 to 10 illustrate results of measurement of distances to stationary objects and the number of connections of the subjected-to-determination pairs in three typical situations 1 to 3 illustrated in FIG. 7. In FIGS. 8 to 10, it is assumed that the measurement cycle is 50 ms and the velocity of the own vehicle is constant.

As illustrated in FIG. 7, the situation 1 is a situation where the own vehicle is traveling in a normal environment and a preceding vehicle is traveling at a lower velocity than the own vehicle. The situation 2 is a situation where the own vehicle is traveling in a normal environment and there is a road-surface reflector, such as a manhole or the like, ahead of the own vehicle. The situation 3 is a situation where the own vehicle is traveling in a specific environment and there is no target ahead of the own vehicle. In the situation 3, it is schematically illustrated that there are a series of reflection points on the ceiling.

FIG. 8 illustrates measurement results in the situation 1, which indicate a mixture of zero and non-zero numbers of connections. As the own vehicle approaches the target (i.e., the preceding vehicle), the likelihood of detecting a larger number of connections increases. The measurement results in FIG. 8 indicate the trend of the number of connections detected for targets that are not overdrivable.

FIG. 9 illustrates measurement results in the situation 2, which indicate that the road-surface reflector is a target with an overdrivable height and the detected number of connections is zero regardless of the distance to the target (i.e., the road surface reflector). The measurement results in FIG. 9 indicate the trend of the number of connections detected for targets that are overdrivable.

That is, when the own vehicle is traveling in a normal environment, the trend of the number of connections detected for a target indicates information about the height of the target.

FIG. 10 illustrates measurement results in the situation 3, which indicate a mixture of zero and non-zero numbers of connections based on reflected waves from the ceiling and the like. In FIG. 10, the distance measurement results indicate distances to a preset target point.

That is, the number of connections detected when the own vehicle is traveling in a specific environment and there is a preceding vehicle ahead of the own vehicle trends a composite of the detection results of the number of connections illustrated in FIGS. 8 and 10. Similarly, the number of connections detected when the own vehicle is traveling in a specific environment and there is a road-surface reflector ahead of the own vehicle trends a composite of the detection results of the number of connections illustrated in FIGS. 9 and 10.

Therefore, in a specific environment, there is no clear difference in the trend of the number of connections detected depending on whether the target is overdrivable or not overdrivable, which means that it is difficult to distinguish between the two targets based on the trend of the number of connections, which in turn reduces the accuracy of detecting information about the targets.

Figure 11:
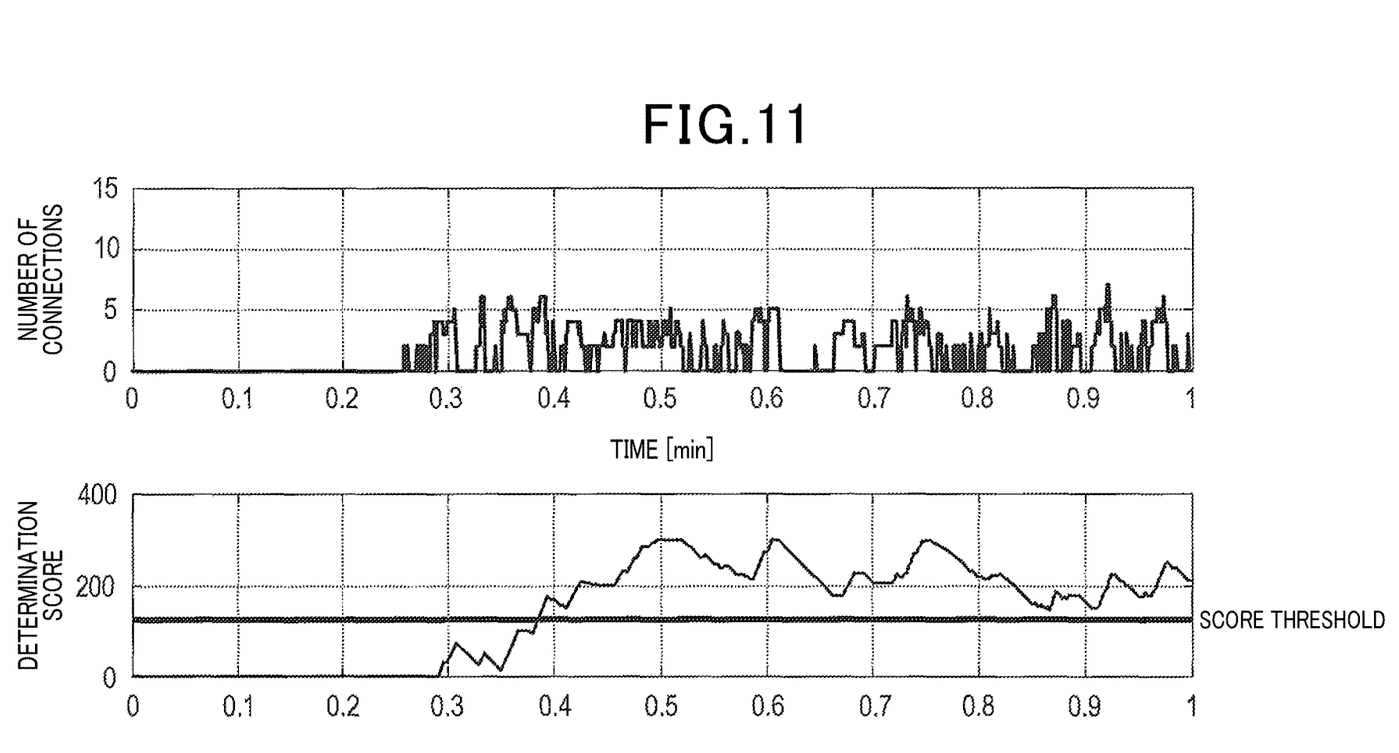
FIG. 11 is graphs illustrating changes with time in the number of connected reflection points and changes with time in determination score detected in a specific environment.

FIG. 11 illustrates graphs of changes with time in the number of connected reflection points and changes with time in determination score detected in a specific environment score, calculated using the subjected-to-determination connection sequences extracted by the velocity condition and the noise floor condition when the own vehicle is traveling in a specific environment.

As illustrated in FIG. 11, even if a non-zero connection number of connections is detected, it will not be reflected in the determination score unless at least one of the velocity condition and the noise floor condition is met. Even if the velocity condition and the noise floor condition are both met, the own vehicle is not immediately determined to be traveling in a specific environment, but is determined to be traveling in a specific environment when the determination score accumulated over the measurement cycles exceed the score threshold.

4. Operations

When the own vehicle travels in a normal environment, it is likely that the noise floor condition is not met and that the velocity condition is not met even if a connection sequence with a non-zero number of connections is detected. Furthermore, for example, even if a connection sequence that meets the velocity condition and has a non-zero number of connections is detected by reflected waves from a signboard or the like located above the road, such a signboard or the like can only be detected singularly. Therefore, in a normal environment, accumulation of the determination score is suppressed and the score threshold is not exceeded, which will cause the specific environment flag to be set to OFF.

When the own vehicle travels in a specific environment, a connection sequence that meets both the noise floor condition and the velocity condition and has a non-zero number of connections is repeatedly detected by reflected waves from a ceiling. Therefore, in the specific environment, accumulation of the determination score is advanced, and in response to the determination score exceeding the score threshold, the specific environment flag is set to ON and the flag is maintained.

When the own vehicle exits the specific environment and returns to the normal environment, a percentage of negative scores accumulated increases. Thus, the determination score decreases, and in response to the determination score falling below the score threshold, the specific environment flag is set to OFF.

5. Advantages

The first embodiment described as above can provide the following advantages.

(5a) In the vehicle-mounted system 1, the radar device 10 provides, together with the target information, the specific environment flag indicating whether the own vehicle is traveling in a specific environment that can reduce the detection accuracy of the target information to the driving assistance ECU 100. Therefore, the driving assistance ECU 100 can perform control according to the specific environment flag, that is, driving assistance control according to the driving environment of the own vehicle. That is, the driving assistance ECU 100 can perform driving assistance control based on the driving environment of the own vehicle. For example, it is possible to inhibit execution of unreliable control based on low accuracy target information.

(5b) In the vehicle-mounted system 1, the radar device 10 extracts a connection sequence based on the reflected waves from the ceiling using the noise floor condition and the velocity condition, and uses an accumulated value of the determination score set based on the number of connections in the connection sequence to determine whether the own vehicle is in a specific environment. Therefore, it is possible to prevent the own vehicle from being erroneously determined as being in a specific environment under a normal environment.

6. Other Embodiments

As above, while the specific embodiment of the present disclosure has been described above, the present disclosure is not limited to the above-described embodiment, and may be implemented with various modifications.

(6a) In the above embodiment, the radar device 10 that acts as an FMCW radar has been described, but the present disclosure is limited to the above embodiment. The radar device 10 may, for example, be configured to act as a 2CW radar, in which the radar wave frequencies are alternately switched, or as a FCW radar, in which a chirp whose radar wave frequency changes in a sawtooth manner is repeated with a short periodicity. Further, the radar device 10 may be configured to switch modulation schemes every measurement cycle.

(6b) The processing unit 70 and its method described in the present disclosure may be implemented by a dedicated computer including a processor and a memory programmed to perform one or more functions embodied by computer programs. Alternatively, the processing unit 70 and its method described in the present disclosure may be implemented by a dedicated computer including a processor formed of one or more dedicated hardware logic circuits, or may be implemented by one or more dedicated computers including a combination of a processor and a memory programmed to perform one or more functions and a processor formed of one or more dedicated hardware logic circuits. The computer programs may be stored, as instructions to be performed by a computer, in a non-transitory, tangible computer-readable storage medium. The technique for implementing the functions of each part included in the processing unit 70 does not necessarily include software, and all of its functions may be implemented using one or more pieces of hardware.

(6c) A plurality of functions possessed by one constituent element in the foregoing embodiments may be implemented by a plurality of constituent elements, or one function possessed by one constituent element may be implemented by a plurality of constituent elements. In addition, a plurality of functions possessed by a plurality of constituent elements may be implemented by one constituent element, or one function implemented by a plurality of constituent elements may be implemented by one constituent element. Some of the components in the foregoing embodiments may be omitted. At least some of the components in the foregoing embodiments may be added to or replaced with the other embodiments.

(6d) The present disclosure is not limited to the above-described target detection apparatus corresponding to the processing unit 70. The present disclosure may be implemented in various forms, such as a system including the target detection apparatus as a component, a program enabling a computer to serve as the target detection apparatus, a non-transitory tangible storage medium, such as a semiconductor memory, storing this program, a target detection method, and an environment determination method and others.

What is claimed is:

1. A target detection apparatus comprising:
a detection unit configured to emit radar waves every preset measurement cycle to a detection region set to include a subjected-to-determination region defined by a horizontal angular range around a direction of travel of a vehicle, and based on received signals of reflected waves from reflection points that reflected the radar waves, detect positions and relative velocities of the reflection points;
an information generation unit configured to generate target information that is information about a target located within the detection region, based on results of detection by the detection unit;
an extraction unit configured to extract the reflection points detected by the detection unit, that are located within the subjected-to-determination region and stationary as subjected-to-determination points;
a connection-sequence generation unit configured to generate a connection sequence by extracting the subjected-to-determination points that are sequentially connected to each other at intervals of less than or equal to an allowable connection distance from one of the subjected-to-determination points as a starting point;
a determination unit configured to, in response to at least one predefined determination condition being met, determine that the vehicle is traveling in a specific environment where accuracy of the target information generated by the information generation unit is decreased, the at least one predefined determination condition including a condition that a determination score set according to a number of the subjected-to-determination points belonging to the connection sequence generated by the connection-sequence generation unit exceeds a score threshold.

2. The target detection apparatus according to claim 1, wherein
the at least one determination condition further includes a condition that a noise floor of the received signals received by the detection unit exceeds a noise threshold.

3. The target detection apparatus according to claim 1, wherein
the determination unit is further configured to calculate the determination score for the connection sequence that meets a velocity condition that $|Vc|>|Vi|\geq|Vc|\cos\theta$, in which Vc is a velocity of the vehicle, Vi is a relative velocity of the subjected-to-determination point representing the connection sequence in a range direction of the radar waves, and an illumination coverage of the radar waves in a vertical direction relative to a horizontal direction is defined by a range of $+\theta$ to $-\theta$.

4. The target detection apparatus according to claim 1, wherein
the determination unit is further configured to compare a sum of the determination score calculated in a previous measurement cycle and the determination score calculated in a current measurement cycle with the score threshold.

5. The target detection apparatus according to claim 4, wherein
the determination unit is further configured to set the determination score to a negative value in response to the connection-sequence generation unit generating no connection sequence including a plurality of the subjected-to-determination points.

6. The target detection apparatus according to claim 1, further comprising an output unit configured to output the target information generated by the information generation unit in association with a result of determination by the determination unit to a downstream processing unit that uses the target information.

* * * * *